US008565757B1

(12) United States Patent
Tran et al.

(10) Patent No.: US 8,565,757 B1
(45) Date of Patent: *Oct. 22, 2013

(54) ASSESSING CALL INTEGRITY OF CALLS COMMUNICATED VIA A MOBILE DEVICE

(71) Applicant: Sprint Communications Company L.P., Overland Park, KS (US)

(72) Inventors: Tuan Quoc Tran, Olathe, KS (US); Jason Norwood Ward, Lee's Summit, MO (US); Kimberly Rae Raddatz, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,039

(22) Filed: Oct. 16, 2012

Related U.S. Application Data

(63) Continuation of application No. 12/898,349, filed on Oct. 5, 2010, now Pat. No. 8,331,925.

(51) Int. Cl.
*H04W 24/00* (2009.01)
*H04B 1/38* (2006.01)
*H04M 1/00* (2006.01)
*G08B 1/08* (2006.01)

(52) U.S. Cl.
USPC ....... 455/425; 455/423; 455/550.1; 455/90.1; 340/539.22; 340/539.24; 340/539.26

(58) Field of Classification Search
USPC .............. 455/424, 550.1, 425, 90.1, 423; 370/468; 340/539.22, 539.24, 539.26
See application file for complete search history.

(56) References Cited

U.S. PATENT DOCUMENTS

| | | | |
|---|---|---|---|
| 6,711,474 B1 * | 3/2004 | Treyz et al. ................... 701/1 |
| 2004/0181712 A1 * | 9/2004 | Taniguchi et al. ............... 714/47 |
| 2006/0097885 A1 * | 5/2006 | Sengupta et al. .......... 340/636.1 |
| 2006/0141945 A1 * | 6/2006 | Korhonen et al. ............ 455/90.1 |
| 2006/0217116 A1 * | 9/2006 | Cassett et al. ................. 455/423 |
| 2008/0025341 A1 * | 1/2008 | Rao et al. ..................... 370/468 |
| 2009/0286579 A1 * | 11/2009 | Warnick et al. ............. 455/575.1 |

* cited by examiner

*Primary Examiner* — Opiribo Georgewill

(57) ABSTRACT

Methods, systems, and computer-readable media are provided for assessing call integrity of calls communicated via a mobile device. In particular, physical aspects of the mobile device that are related to call integrity are identified. The physical condition of the mobile device is then monitored based on the identified physical aspects. The data retrieved from monitoring the physical aspects of the mobile device is then provided to a physical condition assessment component that determines an assessed physical condition of the mobile device. Based on the assessed physical condition of the mobile device, call integrity of calls communicated via the mobile device is determined.

19 Claims, 7 Drawing Sheets

ASSESSING CALL INTEGRITY OF CALLS COMMUNICATED VIA A MOBILE DEVICE

CROSS-REFERENCE TO RELATED APPLICATIONS

This application is a continuation of U.S. patent application Ser. No. 12/898,349, filed Oct. 5, 2010, titled ASSESSING CALL INTEGRITY OF CALLS COMMUNICATED VIA A MOBILE DEVICE, which is herein incorporated by reference.

SUMMARY

Embodiments of the invention are defined by the claims below, not this summary. A high-level overview of various aspects of the invention is provided here for that reason, to provide an overview of the disclosure, and to introduce a selection of concepts that are further described below in the Detailed Description section. This summary is not intended to identify key features or essential features of the claimed subject matter, nor is it intended to be used as an aid in isolation to determine the scope of the claimed subject matter.

Users of mobile devices highly value strong call integrity of calls communicated via their mobile device. Additionally, users of mobile devices generally attribute call integrity to their mobile device service provider. However, damage to the physical condition of a mobile device may contribute to decreased call integrity of calls communicated via the mobile device. Further, damage to the physical condition of the mobile device may not be clearly visible to a user. For example, a user who habitually leaves his mobile device in an extremely hot car may damage components of the mobile device that influence call integrity, but the mobile device may appear to be undamaged. As such, it would be beneficial to allow service providing carriers to distinguish between decreased call integrity caused by a damaged physical condition of a mobile device and decreased call integrity caused by network performance or performance of the mobile device when in manufactured condition.

In a first aspect, a set of computer-executable instructions provide a method of assessing call integrity of calls communicated via a mobile device. Calls communicated via the mobile device comprise calls communicated to the mobile device and calls communicated from the mobile device. The method comprises determining physical aspects of the mobile device associated with call integrity of calls communicated via the mobile device. The method further comprises monitoring the physical aspects of the mobile device associated with call integrity of calls communicated via the mobile device. Data obtained by monitoring the determined physical aspects of the mobile device is then assessed. Additionally, a physical condition of the mobile device is determined based on assessing the data obtained by monitoring the determined physical aspects of the mobile device. Further, the call integrity of calls communicated via the mobile device is categorized based on the physical condition of the mobile device.

In a second aspect, a set of computer-executable instructions provide a method of assessing call integrity of calls communicated via a mobile device. Calls communicated via the mobile device comprise calls communicated to the mobile device and calls communicated from the mobile device. The method comprises determining physical aspects of the mobile device associated with call integrity of calls communicated via the mobile device. The method also comprises monitoring the physical aspects of the mobile device associated with call integrity of calls communicated via the mobile device. Additionally, data obtained by monitoring the determined physical aspects of the mobile device is assessed.

A physical condition of the mobile device is determined based on assessing the data obtained by monitoring the determined physical aspects of the mobile device. Additionally, phone usage information associated with the mobile device is retrieved. The method also comprises assessing a number of call errors of the mobile device based on the phone usage information. Further, the call integrity of calls communicated via the mobile device is categorized based on the physical condition of the mobile device and the number of call errors of the mobile device.

In a third aspect, a set of computer-executable instructions provide a method of assessing call integrity of calls communicated via a mobile device. Calls communicated via the mobile device comprise calls communicated to the mobile device and calls communicated from the mobile device. The method comprises determining physical aspects of the mobile device associated with call integrity of calls communicated via the mobile device. The method also comprises monitoring the physical aspects of the mobile device associated with call integrity of calls communicated via the mobile device. Additionally, data obtained by monitoring the determined physical aspects of the mobile device is assessed.

A physical condition of the mobile device is determined based on assessing the data obtained by monitoring the determined physical aspects of the mobile device. Further, phone usage information associated with the mobile device is retrieved. Additionally, a number of call errors of the mobile device is assessed based on the phone usage information associated with the mobile device. The method also comprises determining whether a threshold number of call errors have been made within a given time period. Additionally, the method comprises categorizing the call integrity of calls based on the physical condition of the mobile device and determining whether a threshold number of call errors have been made within the given period of time.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
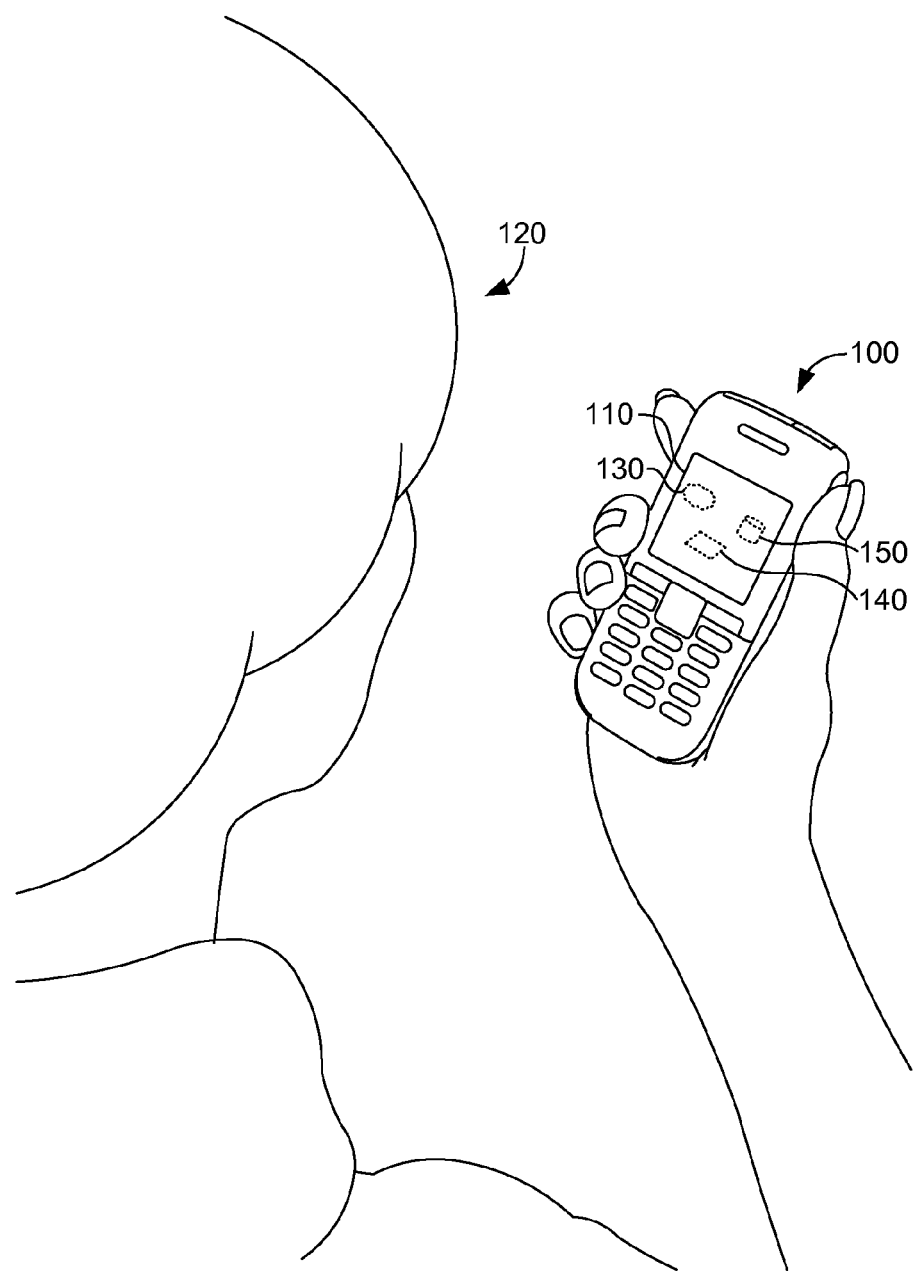
FIG. 1 is a schematic diagram of an illustrative mobile device in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| MP3 | MPEG-1 Audio Layer 3 |
| PC | Personal Computer |
| PDA | Personal Digital Assistant |
| RAM | Random Access Memory |
| ROM | Read Only Memory |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for assessing call integrity of calls communicated via a mobile device. In particular, the assessment of call integrity is based on an assessed physical condition of the mobile device. A mobile device may comprise a handset device. Accordingly, the integrity of calls communicated via a handset device may be determined based on an assessed handset condition. Further, call quality information of calls communicated via the handset device may be utilized with usage patterns of the handset device to determine when the handset device should be replaced. In particular, statistical algorithms may analyze call errors from call quality information to identify call quality degradation in calls communicated via the handset device. As such, the call quality degradation that is assessed through methods of the present invention may not otherwise be detectable from other forms of network data. Call quality degradation may include echoing, static, loss of auditory range of a speaker, or a weakened microphone.

As discussed above, users of mobile devices highly value high call integrity of calls communicated via their mobile devices. Additionally, users of mobile devices may attribute poor call integrity to a service provider of the mobile devices. However, the physical condition of a mobile device may play a primary or contributing role in degradation of the call integrity of calls communicated via the mobile devices. The ability to determine and monitor the condition and communication performance of the mobile device allows a service provider to target mobile device replacement as is necessary to remedy condition induced degraded calling performance.

Accordingly, an assessment of the physical condition of the mobile device is useful in determining whether call integrity of calls communicated via a mobile device may be compromised due to damage to components of the mobile device. For example, if components of the mobile device are exposed to a threshold amount of water, the physical condition of the mobile device components may be damaged. In turn, the damaged components of the mobile device may result in lessened call integrity when the user of the mobile device is communicating on a call. As such, an assessment of the physical condition of a mobile device may be used to determine that the mobile device has been compromised due to physical conditions. Additionally, when a determination has been made that the mobile device has been compromised due to physical conditions, the user of the mobile device may be targeted for advertisements to purchase a new mobile device. Alternatively, when a determination has been made that the mobile device has been comprised due to physical conditions, the user of the mobile device may be targeted with device upgrade incentives as determined feasible by the service provider.

In some aspects of the present invention, call integrity of calls communicated via a mobile device is categorized based on an assessed physical condition of the mobile device. For example, if components of the mobile device associated with call integrity are found to be partially compromised, then the call integrity of calls communicated via the mobile device will reflect that physical condition of the mobile device. In further aspects of the present invention, however, call integrity of calls communicated via a mobile device is categorized based on both the assessed physical condition of the mobile device and the historic phone usage of the mobile device. For example, even if components of a mobile device that are associated with call integrity are damaged, physical condition of the mobile device may be categorized as having little effect on call integrity in cases when the user does not use the mobile device to make calls. For instance, in situations where a user solely uses his mobile device for texting and e-mail, the effect of the physical condition of components of the mobile device associated with call integrity may be negligible on a user's overall satisfaction of a call experience.

By determining the extent to which call integrity of a mobile device is caused by damage to the physical components of the mobile device, users may be informed of the root of resultant decreased call integrity. Further, by determining the mobile device of a user is damaged, mobile device companies may target advertisements for new mobile devices to users who have mobile devices that are physically damaged. Alternatively, mobile device companies may distribute replacement mobile devices to these users. In particular, mobile device companies may distribute excess mobile devices that have been outdated by a new model of the mobile devices. By strategically distributing the outdated mobile devices to users who have mobile devices with physically compromised components, the mobile device companies may increase customer satisfaction and loyalty of these users while disposing of excess mobile devices that have been outdated.

Additionally, monitoring the physical condition of a mobile device allows companies to identify usage patterns of a user, such as the number of times a user typically leaves his mobile device in a hot environment. Accordingly, by comparing usage patterns to call integrity failures, mobile device companies may predict an approximate time that the user's mobile device will have unsatisfactory call reception, and will need to be replaced. As such, companies may use predictive usage patterns to influence allocation of advertising budgets across a number of months.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC. In particular, mobile device 100 may comprise a handset.

Mobile device 100 may include a user interface 110, a user 120, application 130, memory 140, and data structure 150. Generally, user interface 110 provides an input/output (I/O) interface that user 120 may engage to interact with device 100. For example, user interface 110 may include a touch screen that a user may scratch or touch to interact with device 100. This interaction may include initiating a mobile device conditional monitoring component of mobile device 100.

The mobile device 100 can be any computing device. In embodiments, mobile device 100 may be capable of web accessibility. Device 100 might take on a variety of forms, such as a personal computer (PC), a laptop computer, a mobile phone, a personal digital assistance (PDA), a CD player, an MP3 player, a video player, a handheld communications device, a workstation, any combination of these devices, or any other mobile device, including a device that is capable of web accessibility. In one embodiment, device 100 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker (s), memory, a buffer(s), and the like.

Device 100 may also include application 140, memory 150, and data structure 160. Application 130 may carry out various functional aspects and might take on a variety of forms. For example, application 130 might include configuration settings, might facilitate communicating data between multiple devices, might handle updates, include user settings, etc. Specifically, application 130 may be used to implement a method for assessing call integrity of calls communicated via mobile device 100. For example, application 130 may use computer software to monitor physical aspects associated with mobile device 100.

Memory 140 may include a data structure 150 that stores and facilitates the operation of application 140. For example, memory 140 may store data relating to one or more past assessed physical conditions of mobile device 100, as well as information related to habitual physical aspects associated with mobile device 100. In addition, memory 140 may store firmware and other various software modules and components that might be present in mobile device 100. These modules and components may be used in embodiments of the present invention to monitor and assess physical aspects of mobile device 100. Other examples of illustrative software include things such as the operating system of a phone, third-party applications, location-based services, and the like. In sum, FIG. 1 is not meant to indicate all, or even major, systems or components of mobile device 100. An overview of mobile device 100 is presented and certain components are listed so as to be able to refer to them throughout this disclosure.

Figure 2:
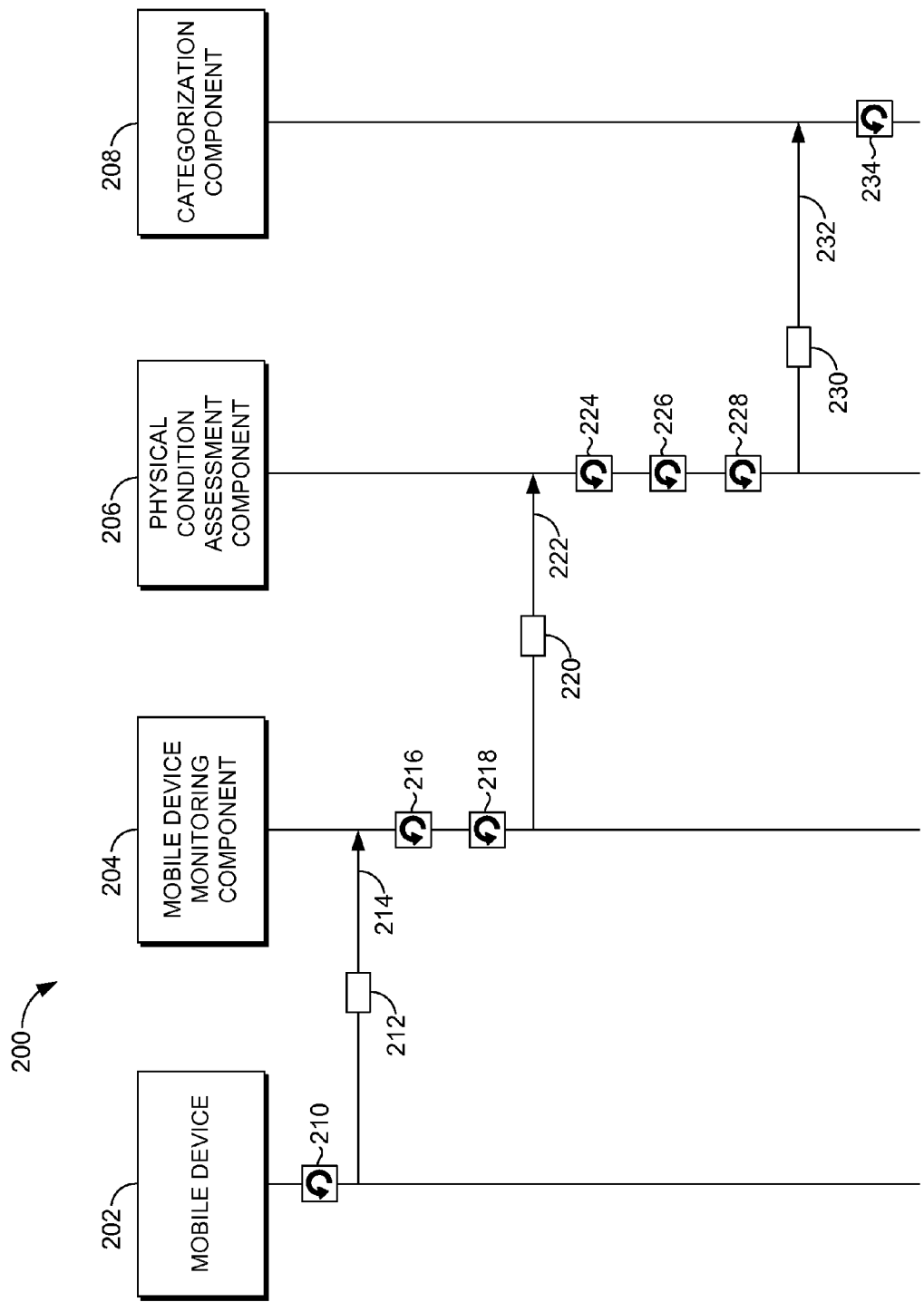
FIG. 2 is a process flow diagram showing an embodiment of a method of assessing call integrity of calls communicated via a mobile device, in accordance with an embodiment of the present invention.

As discussed above, in some aspects of the present invention, call integrity of calls communicated via a mobile device is categorized based on an assessed physical condition of the mobile device. FIG. 2 is a process flow diagram 200 showing an embodiment of a method of assessing call integrity of calls communicated via a mobile device, in accordance with an embodiment of the present invention. In particular, FIG. 2 provides flow diagram 200 for categorizing the call integrity of calls based on the physical condition of the mobile device. Initially, a monitoring request 212 is generated 210 at mobile device 202. The monitoring request 212 may be generated 210 in response to user interaction with mobile device 202. Alternatively, the monitoring request 212 may be generated 210 based on a periodic monitoring in accordance with a mobile device conditional monitoring component, such as mobile device monitoring component 204.

Monitoring request 212 is sent 214 to mobile device monitoring component 204. In particular, the monitoring request 212 comprises a request to monitor physical aspects of the mobile device 202 that influence call integrity of calls communicated via mobile device 202. Once monitoring request 212 is received 216 at mobile device monitoring component 204, monitoring data 220 is generated 218. Monitoring data 220 comprises measurements of the physical aspects of mobile device 202 as discussed above. In particular, the physical aspects of the mobile device 202 may comprise the temperature within the mobile device, the dampness within the mobile device, and the acceleration of the mobile device. These physical aspects may be measured through the use of a thermometer, litmus paper, and an accelerometer, respectively. As indicative of the physical integrity of the mobile device 202, acceleration of the mobile device 202 may be indicative of mobile device drops.

Accordingly, monitoring data 220 is sent 222 to physical condition assessment component 206. Once monitoring data 220 is received 224 at physical condition assessment component 206, the monitoring data 220 is assessed 226 to determine 228 a physical condition 230 of the mobile device 202. Once a physical condition 230 is determined 228, the physical condition 230 is sent 232 to categorization component 208. At categorization component 208, the call integrity of calls communicated via mobile device 202 is categorized 234 based on the physical condition 230 of the mobile device.

Further, a category generated by categorization component 208 may be sent 238 to mobile device monitoring component 204. In particular, the category may be used to determine the frequency of future monitoring of physical aspects of mobile device 202. For example, if the category indicates mobile device 202 has good call integrity, the frequency of monitoring the physical aspects of mobile device 202 may be decreased. Similarly, if the category indicates mobile device 202 has poor call integrity, the frequency of monitoring the physical aspects of mobile device 202 may be increased. Alternatively, the category may be sent to an advertisement component that is used to determine a group of users to target for advertisements directed at a new mobile device. Using categories received from a plurality of mobile devices, including the category associated with mobile device 202, the advertising component may generate a list of users associated with mobile devices having a predetermined category. For example, if the category indicates mobile device 202 has poor call integrity for calls communicated via mobile device 202, the advertisement component may target the user associated with mobile device 202 for a new mobile device.

Figure 3:
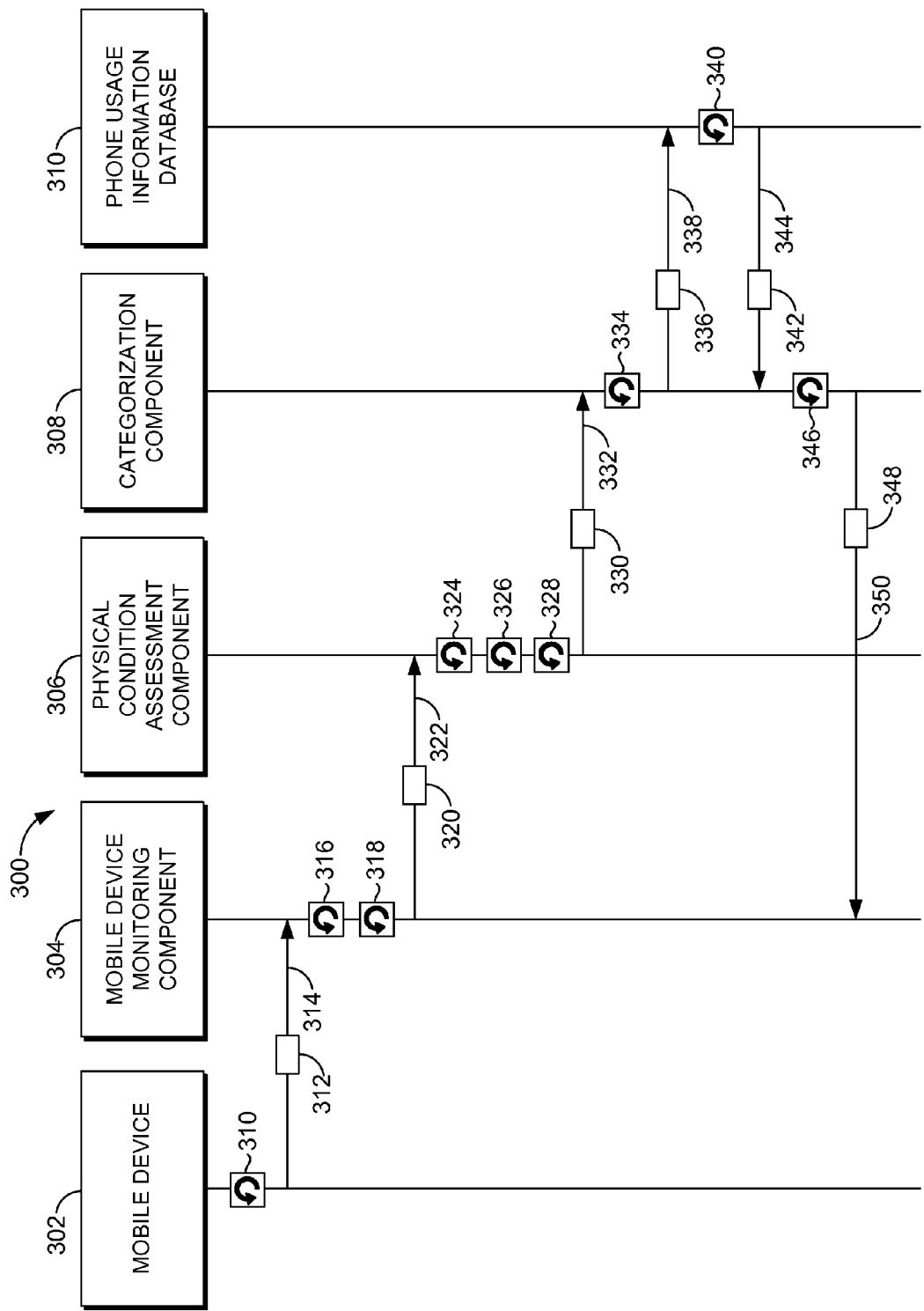
FIG. 3 is another process flow diagram showing an embodiment of a method of assessing call integrity of calls communicated via a mobile device, in accordance with an embodiment of the present invention.

FIG. 3 is another process flow diagram 300 showing an embodiment of a method of assessing call integrity of calls communicated via a mobile device, in accordance with an embodiment of the present invention. In particular, FIG. 3 provides flow diagram 300 for categorizing the integrity of calls based on the physical condition of the mobile device. Initially, a monitoring request 312 is generated 310 at mobile device 302. The monitoring request 312 may be generated 310 in response to user interaction with mobile device 302. Alternatively, the monitoring request 312 may be generated 310 based on periodic monitoring in accordance with a mobile device conditional monitoring component, such as mobile device monitoring component 304.

Monitoring request 312 is sent 314 to mobile device monitoring component 304. In particular, the monitoring request 312 comprises a request to monitor physical aspects of the mobile device 302 that influence call integrity of calls communicated via mobile device 302. Once monitoring request 312 is received 316 at mobile device monitoring component 304, monitoring data 320 is generated 318. Monitoring data 320 comprises measurements of the physical aspects of mobile device 302 as discussed above. In particular, the physical aspects of the mobile device 302 may comprise the temperature within the mobile device, the dampness within the mobile device, and the acceleration of the mobile device. These physical aspects may be measured through the use of a thermometer, litmus paper, and an accelerometer, respectively. As indicative of the physical integrity of the mobile device 302, acceleration of the mobile device 302 may be indicative of mobile device drops.

Accordingly, monitoring data 320 is sent 322 to physical condition assessment component 306. Once monitoring data 320 is received 324 at physical condition assessment component 306, the monitoring data 320 is assessed 326 to determine 328 a physical condition 330 of the mobile device. Once a physical condition 330 is determined 328, the physical condition 330 is sent 332 to categorization component 308. At categorization component 308, a query 336 to phone usage information database 310 may be generated 334. In particular, query 336 sent 338 to phone usage information database 310 may request the frequency of use of mobile device 302, particularly for making phone calls. Phone usage information database 310 may generate 340 phone usage information 342 associated with mobile device 302, which may be sent 344 to categorization component 308. At step 346, categorization component 308 may categorize the call integrity of calls communicated via mobile device 302 based on the physical condition 330 of the mobile device 332 and the phone usage information 342 associated with mobile device 302.

Further, a category 348 generated 346 by categorization component 308 may be sent 350 to mobile device monitoring component 304. In particular, category 348 may be used to determine the frequency of future monitoring of physical aspects of mobile device 302. For example, if category 348 indicates mobile device 302 has good call integrity, the frequency of monitoring the physical aspects of mobile device 302 may be decreased. Similarly, if category 348 indicates mobile device 302 has poor call integrity, the frequency of monitoring the physical aspects of mobile device 302 may be increased. Alternatively, category 348 may be sent to an advertisement component that is used to determine a group of users to target for advertisements to purchase a new mobile device.

Using categories received from a plurality of mobile devices, including category 348 associated with mobile device 302, the advertising component may generate a list of users associated with mobile devices having a predetermined category. For example, if category 348 indicates mobile device 302 has poor call integrity for calls communicated via mobile device 302, the advertisement component may target the user associated with mobile device 302 for a new mobile device.

Figure 4:
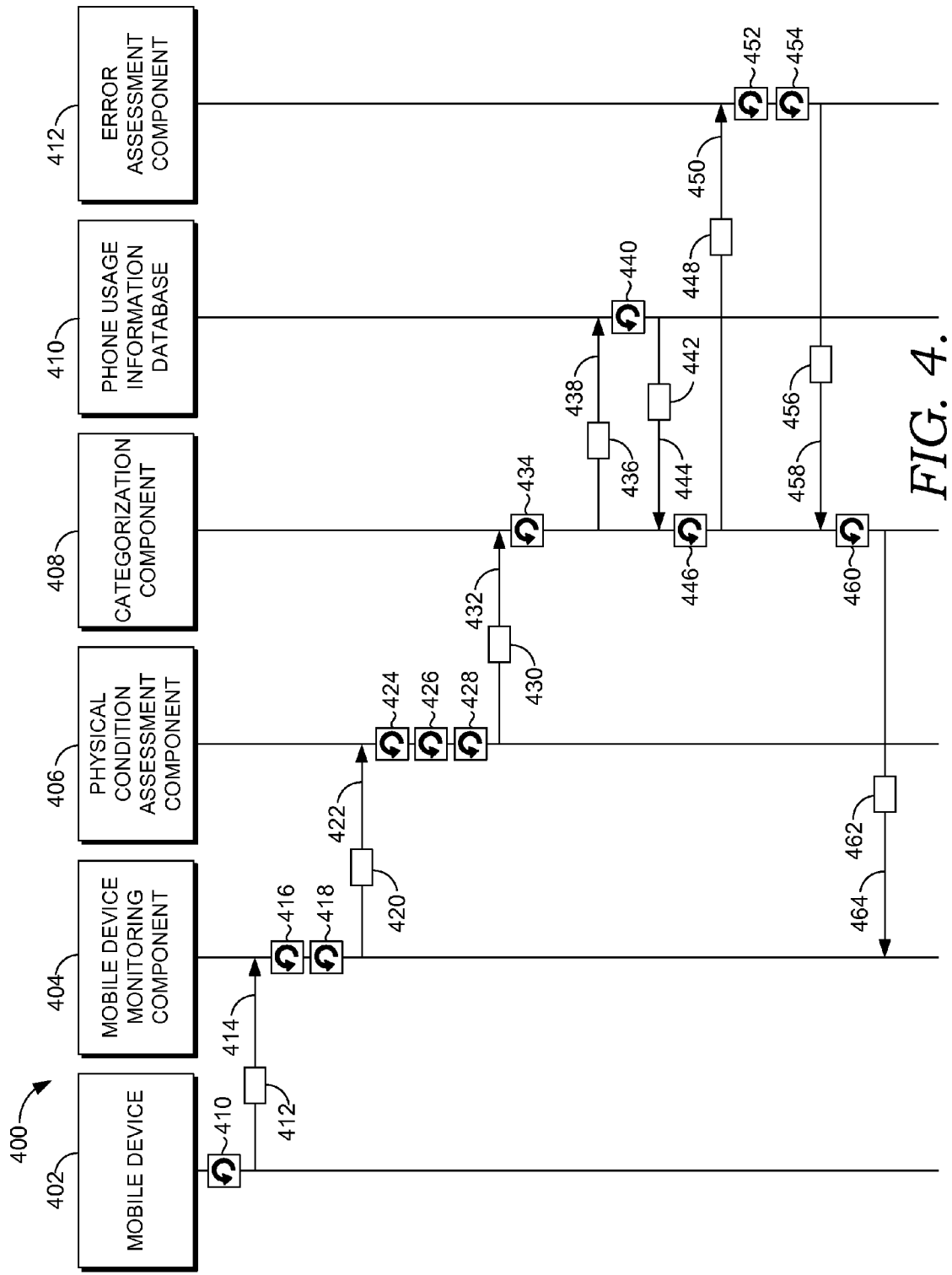
FIG. 4 is a further process flow diagram showing an embodiment of a method of assessing call integrity of calls communicated via a mobile device, in accordance with an embodiment of the present invention.

FIG. 4 is a further process flow diagram 400 showing an embodiment of a method of assessing call integrity of calls communicated via a mobile device, in accordance with an embodiment of the present invention. In particular, FIG. 4 provides flow diagram 400 for categorizing the integrity of calls based on the physical condition of the mobile device. Initially, a monitoring request 412 is generated 410 at mobile device 402. The monitoring request 412 may be generated in response to user interaction with mobile device 402. Alternatively, the monitoring request 412 may be generated 410 based on periodic monitoring in accordance with a mobile device conditioning component.

Monitoring request 412 is sent 414 to mobile device monitoring component 404. In particular, the monitoring request 412 comprises a request to monitor physical aspects of the mobile device that influence call integrity of calls communicated via mobile device 402. Once monitoring request 412 is received 416 at mobile device monitoring component 404, monitoring data 420 is generated 418. Monitoring data 420 comprises measurements of the physical aspects of mobile device 402 as discussed above. In particular, the physical aspects of the mobile device may comprise the temperature within the mobile device, the dampness within the mobile device, and the acceleration of the mobile device.

These physical aspects may be measured through the use of a thermometer, litmus paper, and an accelerometer, respectively. As indicative of the physical integrity of the mobile device, acceleration of the mobile device may be indicative of mobile device drops. Further, monitoring data 420 is sent 422 to physical condition assessment component 406. Once monitoring data 420 is received 424 at physical condition assessment component 406, the monitoring data 420 is assessed 426 to determine 428 a physical condition 430 of the mobile device 402. Once a physical condition 430 is determined 428, the physical condition 430 is sent 432 to categorization component 408.

At categorization component 408, a query 436 to phone usage information database 410 may be generated 334. In particular, query 436 may request the frequency of use of mobile device 402, particularly for making phone calls. Phone usage information database 410 may generate 440 phone usage information 442 associated with mobile device 402, which may be sent 444 to categorization component 406. Further, a query 448 to error assessment component 412 may be generated 446. In particular, query 448 includes phone usage information 442 and may be sent 450 to error assessment component 412 to request a determination of the number of errors in call integrity for calls communicated via mobile device 402.

Error assessment component 412 may assess 452 the number of errors 456 based on phone usage information 442 and may send 458 the number of errors to categorization component 408. Additionally, error assessment component 412 may determine 454 whether the number of errors 456 meets a threshold number of errors within a given period of time. This information may also be included in the number of errors 456 that is sent 458 to categorization component 408.

At step 460, categorization component 408 may categorize the call integrity of calls communicated via mobile device 402 based on the physical condition 430 of the mobile device 402 and the number of errors 456 associated with mobile device 402. As discussed above, the number of errors 456 may additionally include whether a threshold number of errors have occurred within a given period of time. In this alternative, the determination of whether a threshold number of errors have been made may also be used in categorizing 460 the call integrity of calls communicated via mobile device 402.

Further, a category 462 generated 460 by categorization component 408 may be sent 464 to mobile device monitoring component 404. In particular, category 460 may be used to determine the frequency of future monitoring of physical aspects of mobile device 402. For example, if category 462 indicates mobile device 402 has good call integrity, the frequency of monitoring the physical aspects of mobile device 402 may be decreased. Similarly, if category 462 indicates mobile device 402 has poor call integrity, the frequency of monitoring the physical aspects of mobile device 402 may be increased. Alternatively, category 462 may be sent to an advertisement component that is used to determine a group of users to target for advertisements directed at a new mobile device.

Using categories received from a plurality of mobile devices, including category 462 associated with mobile device 402, the advertising component may generate a list of users associated with mobile devices having a predetermined category. For example, if category 460 indicates mobile device 402 has poor call integrity for calls communicated via mobile device 402, the advertisement component may target the user associated with mobile device 402 for a new mobile device.

Figure 5:
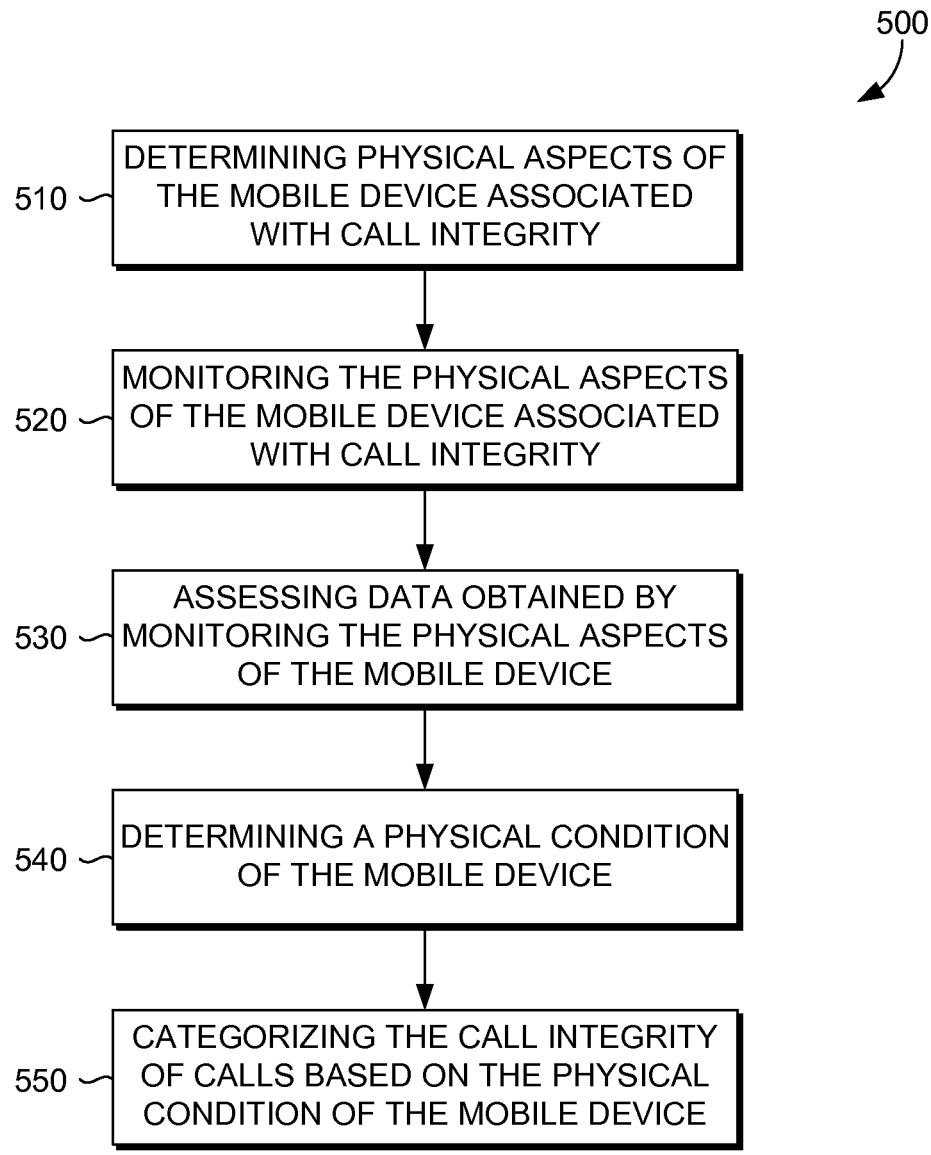
FIG. 5 is a flow diagram showing an embodiment of a method of assessing call integrity of calls communicated via a mobile device, in accordance with an embodiment of the present invention.

FIG. 5 is a flow diagram 500 showing an embodiment of a method of assessing call integrity of calls communicated via a mobile device, in accordance with an embodiment of the present invention. At step 510, physical aspects of the mobile device associated with call integrity of calls communicated via the mobile device are determined. Physical aspects of the mobile device associated with call integrity of calls communicated via the mobile device may include temperature, humidity, or acceleration. The method may also comprise identifying mobile device components associated with call integrity of calls communicated via the mobile device. In particular, the components of the mobile device that are determined to be associated with call integrity of calls communicated via the mobile device may comprise a speaker, a circuit board, a Subscriber Identity Module (SIM) card, etc.

At step 520, the physical aspects of the mobile device associated with call integrity of calls communicated via the mobile device are monitored. For example, the physical aspects may be monitored using litmus paper to determine the dampness or pH within the mobile device. Physical aspects may also be monitored using an accelerometer to indicate when the mobile device is dropped. Further, physical aspects may be monitored using a thermometer to indicate the temperature within the mobile device. Additionally, the physical aspects may be monitored on a periodic basis. Alternatively, the frequency of monitoring the physical aspects of a mobile device may be based on a previously determined physical condition of the mobile device.

At step 530, data obtained by monitoring the determined physical aspects of the mobile device is assessed. At step 540, a physical condition of the mobile device is determined based on assessing the data obtained by monitoring the determined physical aspects of the mobile device. At step 550, the call integrity of calls communicated via the mobile device is categorized based on the physical condition of the mobile device. In particular, the categorization of call integrity of calls communicated via the mobile device may be inversely proportional to the measured damage to the physical condition of the mobile device.

Figure 6:
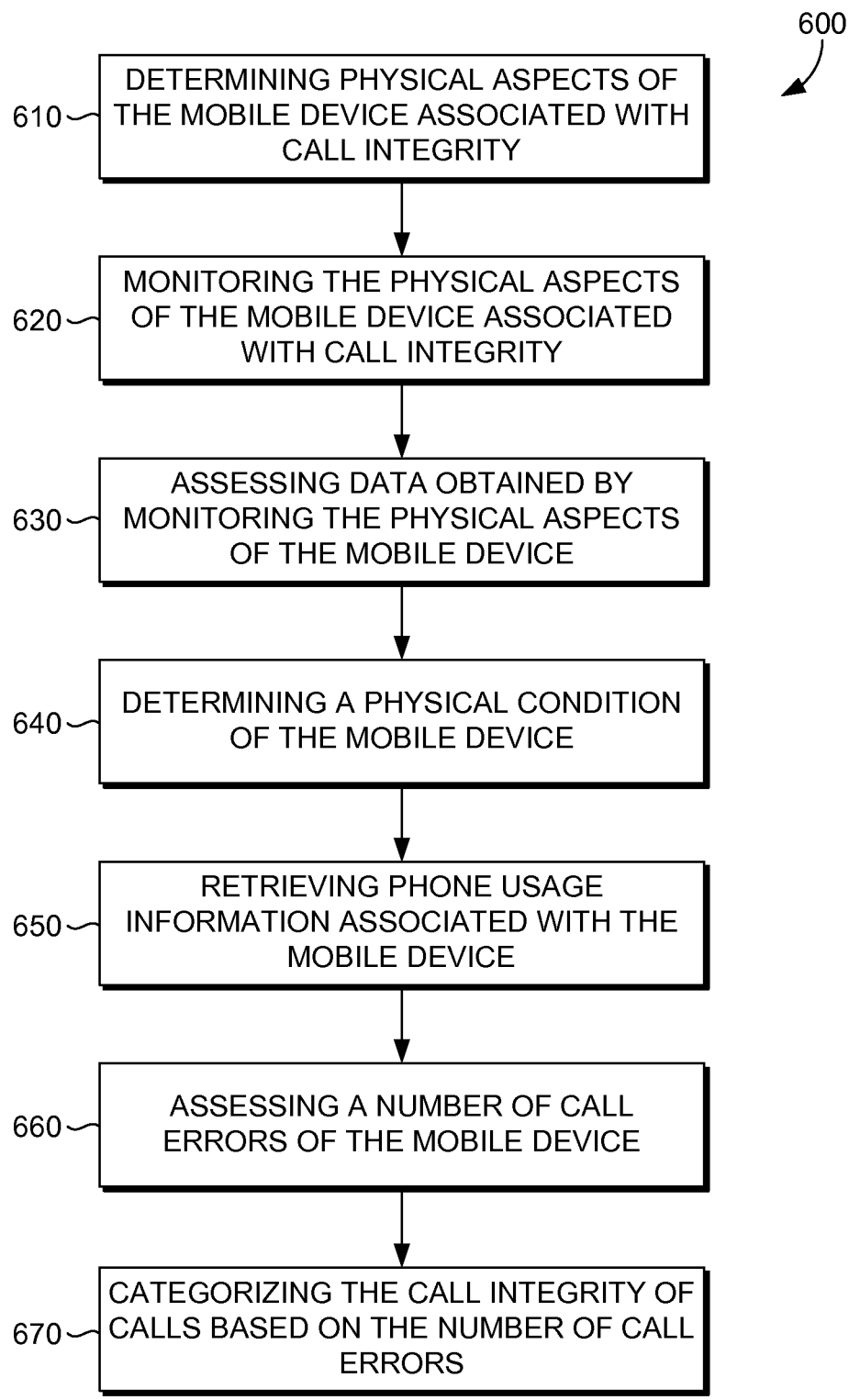
FIG. 6 is a flow diagram showing an embodiment of a method of assessing call integrity of calls communicated via a mobile device, in accordance with an embodiment of the present invention.

FIG. 6 is a flow diagram 600 showing an embodiment of a method of assessing call integrity of calls communicated via a mobile device, in accordance with an embodiment of the present invention. At step 610, physical aspects of the mobile device associated with call integrity of calls communicated via the mobile device are determined. Physical aspects of the mobile device associated with call integrity of calls communicated via the mobile device may include temperature, humidity, or acceleration.

The method may also comprise identifying components of the mobile device that contribute to call integrity of calls communicated via the mobile device. In particular, the components of the mobile device that are determined to be associated with call integrity of calls communicated via the mobile device may comprise a speaker, a circuit board, a Subscriber Identity Module (SIM) card, etc. In embodiments, determining physical aspects of the mobile device associated with call integrity of calls communicated via the mobile device further comprises identifying physical conditions associated with damage to the identified components of the mobile device.

At step 620, the physical aspects of the mobile device associated with call integrity of calls communicated via the mobile device are monitored. The physical aspects may comprise the temperature of components of the mobile device, the number of times the mobile device is dropped, and the dampness of components of the mobile device. Additionally, the physical aspects may be monitored on a periodic basis. Alternatively, the frequency of monitoring the physical aspects of a mobile device may be based on a previously determined physical condition of the mobile device. In further embodiments, the frequency of monitoring the physical aspects of a mobile device may be based on a previously determined physical condition of the mobile device.

At step 630, data obtained by monitoring the determined physical aspects of the mobile device is assessed. At step 640, a physical condition of the mobile device is determined based on assessing the data obtained by monitoring the determined physical aspects of the mobile device. At step 650, phone usage information associated with the mobile device is retrieved. At step 660, a number of call errors of the mobile device is assessed based on the phone usage information. Further, at step 670, the call integrity of calls is categorized based on the physical condition of the mobile device and the number of call errors of the mobile device.

Figure 7:
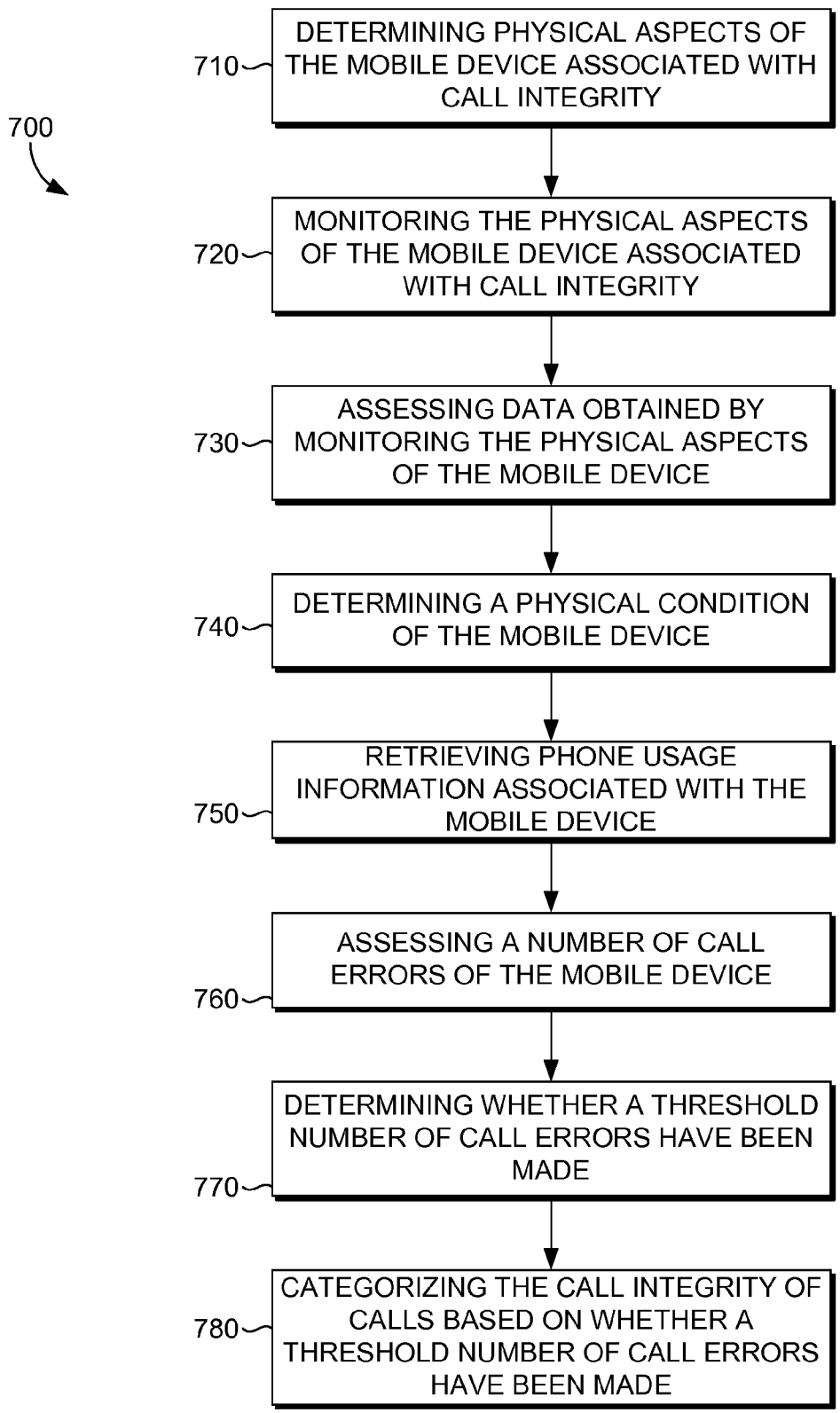
FIG. 7 is a flow diagram showing an embodiment of a method of assessing call integrity of calls communicated via a mobile device, in accordance with an embodiment of the present invention.

FIG. 7 is a flow diagram 700 showing an embodiment of a method of assessing call integrity of calls communicated via a mobile device, in accordance with an embodiment of the present invention. As indicated at step 710, physical aspects of the mobile device associated with call integrity of calls communicated via the mobile device are determined. For example, determining physical aspects of the mobile device associated with call integrity of calls communicated via the mobile device may comprise identifying components of the mobile device that influence call integrity of calls communicated via the mobile device. In particular, the components of the mobile device that are determined to be associated with call integrity of calls communicated via the mobile device may comprise a speaker, a circuit board, a Subscriber Identity Module (SIM) card, etc.

At step 720, the physical aspects of the mobile device associated with call integrity of calls communicated via the mobile device are monitored. The physical aspects may be monitored on a periodic basis. Alternatively, the frequency of monitoring the physical aspects of a mobile device may be based on a previously determined physical condition of the mobile device. In further embodiments, the frequency of monitoring the physical aspects of a mobile device is based on a previously determined physical condition of the mobile device. At step 730, data obtained by monitoring the determined physical aspects of the mobile device is assessed.

At step 740, a physical condition of the mobile device is determined based on assessing the data obtained by monitoring the determined physical aspects of the mobile device. At step 750, phone usage information associated with the mobile device is retrieved. At step 760, a number of call errors of the mobile device are assessed based on the phone usage information associated with the mobile device. At step 770, a determination is made as to whether a threshold number of call errors have been made within a given period of time. At step 780, the call integrity of calls are categorized based on the physical condition of the mobile device and determining whether the threshold number of call errors have been made within a given period of time. For example, the call integrity of calls may be categorized to indicate the mobile device has poor call integrity of calls communicated via the mobile device. Additionally, the mobile device may be targeted to receive an advertisement based on the poor call integrity of calls communicated via the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of assessing call integrity of calls communicated via a mobile device, the method comprising:

determining physical aspects of the mobile device associated with call integrity of calls communicated via the mobile device;

monitoring the physical aspects of the mobile device associated with call integrity of calls communicated via the mobile device, wherein the physical aspects of the mobile device comprise a number of times that the mobile device has experienced at least one physical trauma to an exterior portion of the mobile device;

determining a physical condition of the mobile device has worsened based on assessing the data obtained by monitoring the physical aspects of the mobile device; and categorizing the call integrity of calls communicated via the mobile device based on the physical condition of the mobile device.

2. The computer-readable media of claim 1, further comprising:

identifying mobile device components associated with call integrity of calls communicated via the mobile device.

3. The computer-readable media of claim 1, wherein the physical aspects are monitored using litmus paper.

4. The computer-readable media of claim 1, wherein the physical aspects are monitored using an accelerometer.

5. The computer-readable media of claim 1, wherein the physical aspects are monitored using a thermometer.

6. The computer-readable media of claim 1, wherein the physical aspects are monitored on a periodic basis.

7. The computer-readable media of claim 1, wherein a frequency of monitoring the physical aspects of the mobile device is based on a previously determined physical condition of the mobile device.

8. The computer-readable media of claim 1, wherein the method further comprises identifying components of the mobile device associated with call integrity of calls originating from the mobile device.

9. The computer-readable media of claim 8, wherein the method further comprises identifying physical conditions associated with damage to the identified components of the mobile device.

10. Non-transitory computer-readable media having computer-executable instructions embodied thereon that, when executed, facilitate a method of assessing call integrity of calls communicated via a mobile device, the method comprising:

monitoring physical aspects of a mobile device;

determining that the mobile device has experienced a physical trauma by assessing data obtained by monitoring the physical aspects of the mobile device, wherein the physical aspects of the mobile device comprise a number of times that the mobile device has experienced at least one physical trauma to an exterior portion of the mobile device;

retrieving phone usage information associated with the mobile device;

assessing a number of call errors of the mobile device based on the phone usage information; and correlating the physical trauma with a decrease in call integrity of calls communicated via the mobile device based on the number of call errors experienced by the mobile device before and after the physical trauma occurred.

11. The computer-readable media of claim 10, further comprising:

identifying components of the mobile device that contribute to call integrity of calls communicated via the mobile device.

12. The computer-readable media of claim 11, wherein the method further comprises identifying physical conditions associated with damage to identified components of the mobile device.

13. The computer-readable media of claim 11, wherein the physical aspects comprise temperature of components of the mobile device.

14. The computer-readable media of claim 10, wherein the physical aspects comprise a number of times the mobile device is dropped.

15. The computer-readable media of claim 10, wherein the physical aspects are monitored on a periodic basis.

16. The computer-readable media of claim 10, wherein a frequency of monitoring the physical aspects of the mobile device is based on a previously determined physical condition of the mobile device.

17. Non-transitory computer-readable media having computer-executable instructions embodied thereon that, when executed, facilitate a method of assessing call integrity of calls communicated via a mobile device, the method comprising:
- monitoring physical aspects of the mobile device associated with call integrity for calls communicated via the mobile device;
- determining that the mobile device has experienced a physical trauma by assessing data obtained by monitoring the physical aspects of the mobile device;
- retrieving phone usage information associated with the mobile device;
- assessing a number of call errors of the mobile device based on the phone usage information associated with the mobile device;
- categorizing the call integrity of calls based on a physical condition of the mobile device and determining that a threshold number of call errors have been made within a given period of time since the physical trauma occurred; and
- upon determining that the threshold number of call errors have been made, targeting an advertisement to a user of the mobile device based on the physical condition of the mobile device.

18. The computer-readable media of claim 17, wherein the call integrity of calls is categorized to indicate the mobile device has poor call integrity of calls communicated via the mobile device.

19. The computer-readable media of claim 17, wherein the mobile device received a customer service inquiry upon determining that greater than above a threshold number of call errors have been made since the physical trauma.

* * * * *